(No Model.)
W. COLE.
VEHICLE SPRING.
No. 286,532. Patented Oct. 9, 1883.
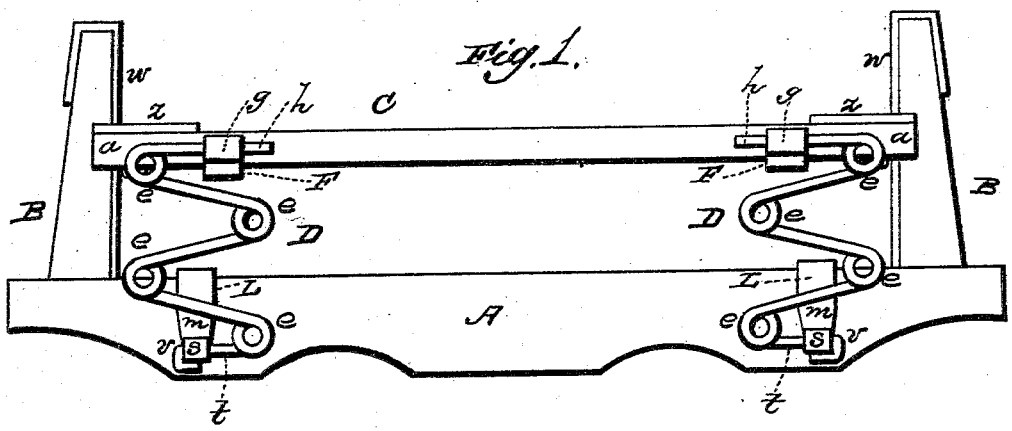
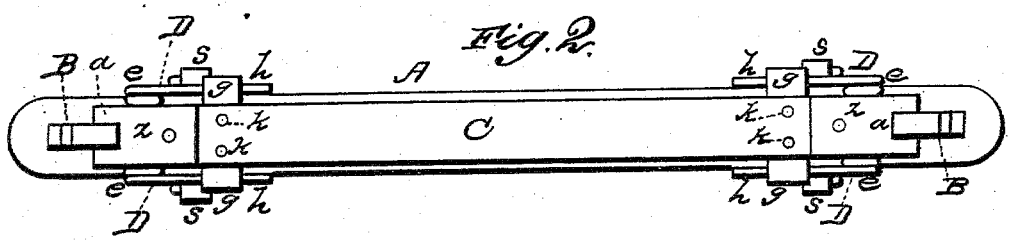
Fig. 3.
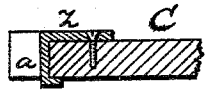
Fig. 4.
Fig. 5.
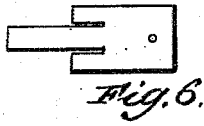
Fig. 6.
WITNESSES
E. H. Bates,
Philip Massi.
INVENTOR
Wesley Cole
by Anderson & Smith
his ATTORNEYS

UNITED STATES PATENT OFFICE.

WESLEY COLE, OF MENOMONEE, WISCONSIN.

VEHICLE-SPRING.

SPECIFICATION forming part of Letters Patent No. 286,532, dated October 9, 1883.

Application filed January 4, 1883. (No model.)

*To all whom it may concern:*

Be it known that I, WESLEY COLE, a citizen of the United States, residing at Menomonee, in the county of Dunn and State of Wisconsin, have invented certain new and useful Improvements in Vehicle-Springs; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a front view of my device. Fig. 2 is a top view of the same, and Figs. 3, 4, 5, and 6 are detail views.

This invention has relation to vehicle-springs; and it consists in the construction and novel arrangement of devices, as hereinafter set forth, and particularly pointed out in the claim appended. It embodies improvements made by me to the invention patented August 12, 1880, to myself.

In the accompanying drawings, the letter A designates the bolster of a wagon, and B the uprights or standards thereof.

C indicates the spring-bar or transverse bar to which the bed or box of the wagon is attached, or upon which it rests.

D D represent the springs, which are made of steel wire, bent in zigzag form, with coils at the bends, as indicated at $e$. These springs are arranged in pairs on each side of and at each end of the spring-bar C, extending from the same downward to the bolster A.

F designates the upper coupling, which consists of a plate having at each end a bearing, $g$, which, when said coupling is secured to the spring-bar, extends beyond the edges of said bar. In the bearings $g$ the upper ends or arms, $h$, of the springs D are seated, being secured in place by rivets $k$.

L represents the lower coupling-plate, which is preferably made in stirrup form to fit the bolster A, its arms $m$ extending downward on the rear and front surfaces of said bolster, and being provided with bearings $s$, to receive the hook ends $v$ of the lower arms, $b$, of the springs. The bearings $s$ are formed by extending the arms $m$ of the couplings outward from the bolster. When, therefore, the springs are in position, they will extend in zigzag form from their bearings in the upper couplings to the bearings in the lower couplings, the planes of the springs being parallel to the rear and front faces of the bolster and spring-bar. The movements of the springs will therefore be free and untrammeled by the spring-bar and bolster, as no portion of a spring is interposed between said bolster and bar.

The standards or uprights B are usually armed on the inner surfaces with metallic strips $w$, and in order to avoid undue wear of the spring-bar its notched ends $a$, which engage said standards, are provided with notched metallic wear-plates $z$. The spring-bar has therefore a pair of springs, D, at each end, so that the bar A is swung between them, being supported in front and rear.

These springs are easily made and readily applied, and are especially adapted to wagons used on rough roads.

In my former patent, No. 237,964, of November 30, 1880, I have formed a spring from round steel wire, bent first at the middle of the piece back nearly upon itself, and the arms thus formed I have bent into corresponding U-form bends, as is clearly shown in Fig. 3 of said patent. I have employed two only of these springs to each bolster, the lower free ends of the springs entering eye-clips secured to the bolster near each end, and the upper or V-form portions of the springs being secured to the under face of the cross-bar by staples. In said construction a portion—in fact, the greater portion—of the spring lies between the cross-bar and the bolster. I am also aware that a pair of "Puliam bolster-springs" have been connected at their lower ends to a saddle resting on the bolster, and that their upper ends have been secured to the under face of a wear-piece having projecting lugs to receive the standards, said wear-piece being secured to the end of the cross-bar. In this instance, too, the ends of the springs and the saddle intervened between the cross-bar and the bolster. A compound spring formed of two triple helical springs connected together by a bail, the whole made of a single piece of wire, has been connected by the bail to the platform at the top, and by its free ends to the foundation-rails at the bottom, of a bed-bottom; but these constructions differ from mine now presented, and I make no broad claim to any of them. Sockets connected to each side of the bolster, and a support for the body and springs confined in said sockets, are also old in this connection.

Having described this invention, what I claim, and desire to secure by Letters Patent, is—

The combination, with the spring-bar and bolster, of the pairs of zigzag springs D D, having coils e at their bends, and couplings F and L, connecting the ends of said springs to the spring-bar and bolster, substantially as specified.

In testimony whereof I affix my signature in presence of two witnesses.

WESLEY COLE.

Witnesses:
O. N. TWEET,
PETER PETERSON.